Aug. 19, 1952 R. H. LARSON ET AL 2,607,262
FILM ADVANCE MECHANISM FOR PROJECTORS
Filed March 10, 1949 2 SHEETS—SHEET 1
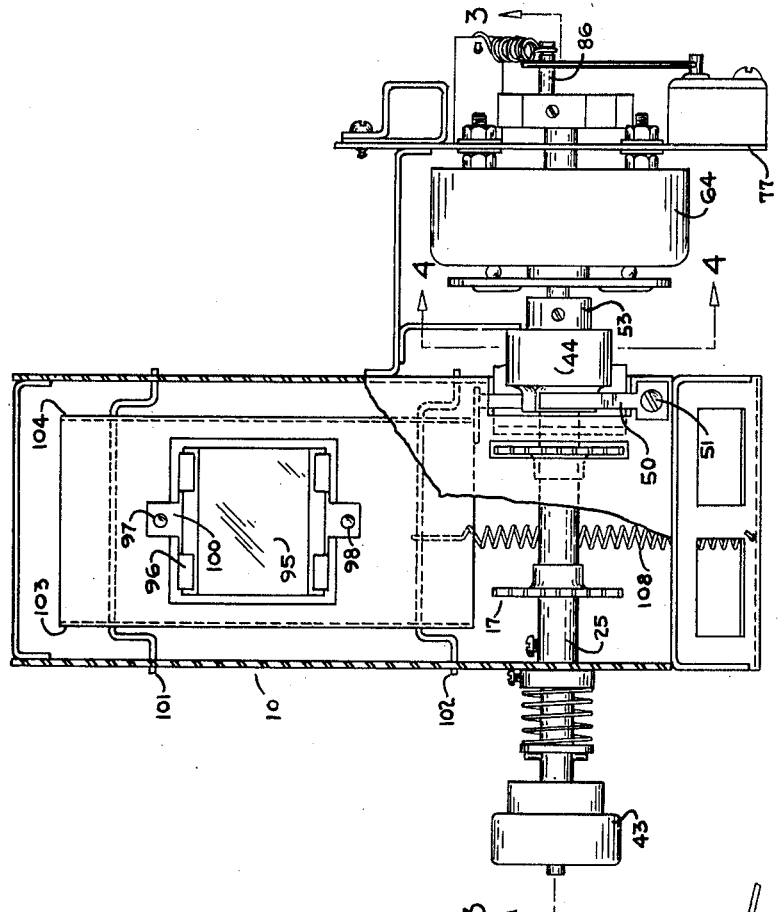
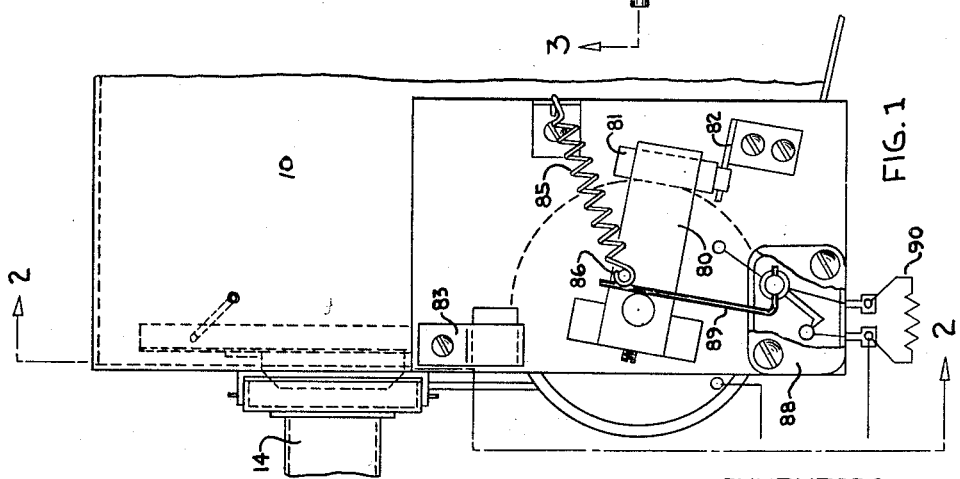
INVENTORS
ROBERT H. LARSON
MICHAEL C. SUPITILOV
BY Robert L. Kahn
ATTORNEY

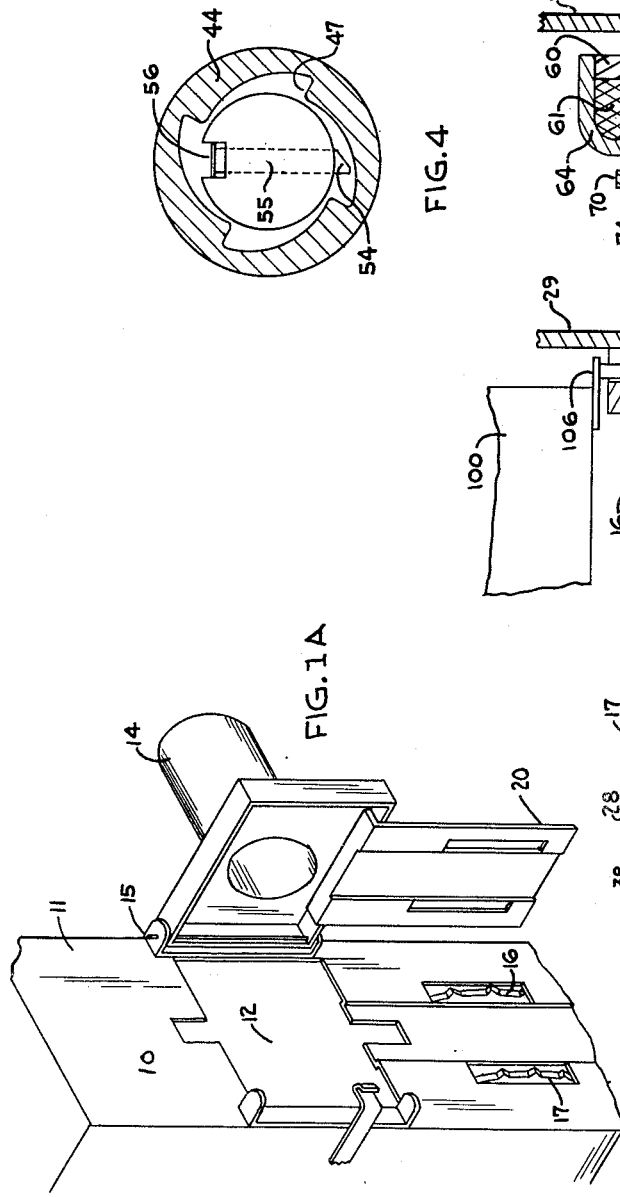
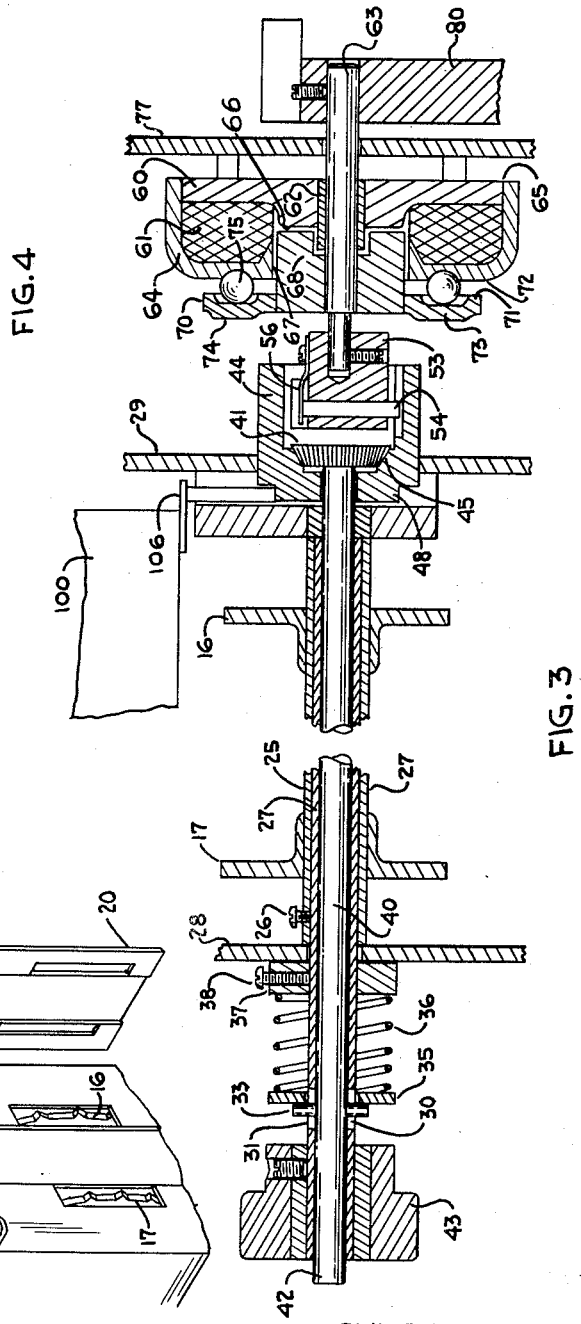

Patented Aug. 19, 1952

2,607,262

UNITED STATES PATENT OFFICE 2,607,262

FILM ADVANCE MECHANISM FOR PROJECTORS

Robert H. Larson, Batavia, and Michael C. Supitilov, St. Charles, Ill., assignors to Du Kane Corporation, a corporation of Illinois Application March 10, 1949, Serial No. 80,686

2 Claims. (Cl. 88—18.2)

1

This invention relates to a film advance mechanism for strip film projectors.

Projectors for handling strip film are in wide use today. Such projectors provide for the projection of a frame of film at a time, the frame remaining in position for any desired length of time. In certain applications involving sychronizing sound reproduction and picture projection, it is desirable that a frame be changed at a comparatively high speed so that two or three successive frames may be exposed within a matter of seconds. Such a change is slow compared to moving pictures but is substantially more rapid than can be accommodated by most present day mechanisms.

The growing interdependence of sound reproduction and picture projection in a dual type system makes it desirable that a picture frame advance means be power operated rather than manually operated. Apart from the question of speed, there is the question of timing as well as the possible requirement for remote control.

While various attempts have been made to provide a power advance for strip film in a picture projector, such means as a rule have been bulky, cumbersome and expensive. A well-designed power advance means should operate fast and yet should be sufficiently gentle with the film so that the sprocket drive for engaging the film will have no tendency to rip the film. Furthermore, such a system should have a manual adjustment for framing purposes and should also have a manual advance for manual operation in the event of a power failure or in the event that an operator desires to superimpose a manual operation.

Inasmuch as sound reproducing and picture projecting systems are frequently carried by salesmen, portability and light weight is an important consideration. Economy of manufacture and assembly is also important and an additional important feature is the ease with which such a power drive may be adapted to a standard projector construction.

A construction embodying the present invention fulfills the above desirable design features to a high degree and provides a simple, effective and powerful film drive for general purposes.

In order that the invention may be understood, it will now be explained in connection with the drawings wherein Figure 1 is a side elevation of a portion of a projector and showing the invention.

Figure 1-A is a perspective view of the front of the projector of Figure 1 with the gate open.

Figure 2 is a front view of the device shown in

2

Figure 1, with certain parts in section and broken away.

Figure 3 is a sectional detail on line 3—3 of Figure 2.

Figure 4 is a sectional detail along line 4—4 of Figure 2.

Referring now to the drawings, any desired projector may be used, such projector being generally indicated by numeral 10. Projector 10 has panel 11 having portion 12 cut out therefrom and forming a film gate. In accordance with usual practice a picture frame is disposed at film gate 12 and has focused thereon a beam of light from a suitable light source, said beam being operated upon by suitable reflecting and condensing means all well known in the art. Lens barrel 14 hingedly secured at gate 12 is provided, said lens barrel having suitable lens system for magnifying the image from the frame so that projection is effected. The lens barrel is preferably hinged on a vertical pin as shown at 15 so that the lens barrel may be swung horizontally out of normal operating position of the device to open up the gate for positioning film.

Along panel 11 and in the path of the film travel, in this particular instance after the film gate, are sprockets 16 and 17 having portions extending through slots in panel 11 for engagement with sprocket holes in film strip. These sprockets are movable on a horizontal axis behind the panel as will be more fully explained.

Plate 20 overlying the film at the sprocket portions is provided, said plate being carried by the lens barrel for movement to clear the panel. This construction is more fully disclosed and claimed in Patent No. 2,438,710, and is provided to facilitate threading the film when starting. Other film retaining means well known in the art may be used if desired.

Now referring to sprockets 16 and 17, these are carried on sleeve 25 rigidly secured thereto to function as a unit. Sleeve 25 has set screw 26 for rotatively locking sleeve 25 to inner sleeve 27. Inner sleeve 27 is journalled in sides 28 and 29 of the projector frame for rotation. Inner sleeve 27 has transversely aligned slots 30 and 31 at a portion spaced outwardly from projector side 28. Passing through slots 30 and 31 is cross pin 33 and between the pin and projector side 28 are washer 35, coil spring 36 and collar 37. Collar 37 is locked to inner sleeve 27 by set screw 38 and this collar together with locked sprocket sleeve 25 maintains inner sleeve 27 longitudinally in position.

Disposed within inner sleeve 27 is pin 40 having knurled tapered driving head 41 at one end. Pin 40 has a transverse passage for accommodating cross pin 33 so that pin 40 and inner sleeve 27 are rotatively locked together. It will be noted that slots 30 and 31 in sleeve 27 are elongated along the sleeve axis so that pin 40 may be moved longitudinally a short distance. Coil spring 36 normally urges pin 40 outwardly from projector side 28. Pin 40 has end portion 42 projecting beyond the end of inner sleeve 27. Knob 43 is bolted to inner sleeve 27 while pin end 42 extends free of the knob. If desired, a knob may be attached to pin end 42. It is clear that pin 40 may be moved inwardly of sleeve 27 a limited distance and against coil spring 37.

Rotatively held by projector side 29 is cup-shaped clutch member 44 having knurled tapered portion 45 at the bottom thereof. The bottom of member 44 is apertured to accommodate pin 40. The knurled portions on driving head 41 and tapered portion 45 are adapted to cooperate when pin 40 is in its spring biased position. When pin 40 is moved inwardly against the bias of spring 36, driving head 41 will clear the knurled part on cup 44 and permit the pin to rotate free of cup 44 and sprockets 16 and 17.

Cupped member 44 has four cam surfaces 47 formed on the interior thereof near the open end of the cup. Cupped member 44 also has reduced portion 48 shaped to a square section. Cooperating with square portion 48 is flat spring 50 bearing upon the square portion and having one end anchored at 51 to the projector frame. It is evident that spring 50 provides an index action and permits cupped member 44 to assume any one of four stable positions.

Cupped member 44 may be driven in only one direction by head 53. This head extends within cupped member 44 and has transverse cam detent 54 operating in slot 55 and biased by spring 56 to extend outwardly of the head. It will be noted that detent 54 is shaped like a ratchet tooth and cooperates with cam surfaces 47 to provide positive drive in only one direction. This direction is selected so that the film sprockets will turn to advance film through the projector gate.

Head 53 is moved through an arc of 90° by a solenoid motor. This motor comprises annular ferro-magnetic frame 60 carrying annular winding 61. Frame 60 has axial bore 62 within which lies stub shaft 63 rotatable therein. Concentric with frame 60 and covering winding 61 is top frame member 64. Frames 60 and 64 are both of ferro-magnetic material, such as soft iron, and are in close contact at 65. However, top surface 66 and inner edge 67 of top frame member 64 form pole faces. Attached to shaft 63 is rotor 68 of soft iron. This rotor is shaped to provide complementary pole faces. Rotor 68 carries cover plate 70 which may be integral with the rotor if desired. Opposing faces 71 and 72 of the cover plate and top frame member have circular arcuate cam slots 73 and 74 formed therein. Each pair of cam slots has ball bearing 75 therein. The cam slots are so shaped that movement of rotor 68 in one direction permits the rotor to approach the frame and reverse movement increases the distance between the rotor and frame. When the winding is energized, magnetic flux will pass between pole faces 66 and 67. Rotor 68 will thus be drawn toward the pole faces to travel in an axial direction and by virtue of the cam slots, the rotor will turn. Thus the rotor will describe a helix in going from one position to the other position. This type of a rotary solenoid is available on the market and is more fully disclosed in patent, 2,430,940 issued November 18, 1947. It is clear that if the rotor is biased to its outermost position, energization of winding 61 will cause rotor movement through an angle depending upon the angular extent of the cam slots. For the purpose at hand, a movement in excess of 45° is necessary. Preferably a rotor movement slightly more than 90° is desirable. Thus the rotor can be oriented so that the pawl will always start behind the cam rise as shown in Figure 4 and travel the full range.

The motor is attached to bracket 77 and has one end of shaft 63 locked to driving head 53. The other end of the shaft carries counter-balanced arm 80. Arm 80 carries rubber bumpers 81 and operates between stops 82 and 83 carried by the bracket. Spring 85 extending between an ear on the bracket and eccentric pin 86 on the arm biases the solenoid rotor in a position providing maximum separation between the rotor and frame.

Bracket 77 also carries switch 88 having finger 89 cooperating with eccentric pin 86. Resistor 90 in series with the solenoid winding is normally shorted out by switch 88 in the de-energized position of the solenoid. However, when arm 80 is turned by the solenoid due to energization, switch 88 is opened near the end of the arm movement. In this position, the solenoid winding circuit has sufficient resistance to prevent damage in case of prolonged solenoid energization. It is understood, of course, that the solenoid must remain in its energized position in spite of the resistor in the circuit.

In order to provide a flat transparent surface against which a film frame may rest during projection, it is customary to have a glass plate. Thus glass plate 95 is provided at frame gate 12. This invention provides means for moving the glass plate when a frame is changed so as to minimize the danger of film scratching. Thus glass plate 95 is carried in clip 96 spring supported at 97 and 98 on rockable frame 100. Frame 100 is supported on bent wires 101 and 102 passing through side flanges 103 and 104 of the frame. Wires 101 and 102 are bent to form cranks and are pivotally mounted in apertures through the sides of the projector frame. Rockable frame 100 has foot 106 extending down and bearing against square portion 48 for rocking the movable frame vertically with movement of the square portion. Springs 108 extending between wire 102 and a fixed portion of the projector frame provide a generally downward bias to the rockable frame and keep the same bearing tightly against square portion 48.

It will be noted that in the normal rest position of the rockable frame, wire 101 has its arms sloping at an angle to the horizontal. Thus when this wire is moved with upward movement of the rockable frame, the upper portion of the rockable frame will be moved backwardly away from the projector panel 11 as well as upwardly. To some extent the bottom of the rockable frame will be moved rearwardly but this motion is small since the foot must remain in position against square portion 48. When square portion 48 has raised rockable frame 100 its maximum distance and begins to drop the frame, then the reverse action occurs. Frame 100 drops and at the same time approaches panel 11 thus moving glass plate 95 both forwardly and downwardly. Hence, when the film frame has almost reached its final position (the film travels downwardly in this instance) the glass plate will be travelling with the film frame as it begins to contact the same. Both the glass plate and film frame will be travelling together and come to rest at the same time, thus preventing scratching of the film.

In the operation of the solenoid, the armature will be drawn to the right as seen in Figures 2 and 3. By virtue of the overdrive construction, cam 54 can move longitudinally of cupped member 44. Furthermore, counter-weighted lever 80 will provide dynamic balance so quick action of the solenoid is possible to minimize vibration and noise.

While the mechanism disclosed provides for 90° advance per frame, other angles may be selected.

What is claimed is:

1. A film advance mechanism for a projector, said mechanism comprising a sleeve carrying sprockets, means for mounting said sleeve for rotation in said projector, a pin within said sleeve extending beyond the two sleeve ends, means for rotatively coupling said pin and sleeve while permitting longitudinal movement of said pin with respect to said sleeve, an apertured cupped member rotatively supported in said projector, said pin having an end projecting through the apertured bottom of said cupped member, said projecting pin end carrying a clutch part for cooperation with the bottom of said cupped member for establishing a driving connection, means for biasing said pin with respect to said sleeve so that said clutch part normally engages said cupped member, said cupped member having a plurality of cam surfaces formed on the inside thereof to function as part of an over-running drive, a driving member extending into said cupped member, a finger carried by said driving member and radially movable with respect thereto, said finger functioning as a cam and cooperating with said cam surfaces for driving the cupped member in one direction only, said driving member and finger being longitudinally movable with respect to said cupped member, and a rotary solenoid for driving said driving member, said solenoid having relatively fixed and movable portions and having cam means for directing the movable portion of said solenoid along a generally helical path with the axis of the helix being coincident with the axis of the driving member, index means for locating normal rest positions for said sprockets, said solenoid when energized being adapted to move said sprockets through a frame advancing angle and thereafter said solenoid returns to a normal starting position in preparation for a new cycle.

2. The structure according to claim 1 wherein a carriage is provided, said carriage including a film frame rest, and means for moving said carriage through a cycle in synchronism with the sprocket means, said carriage cycle providing for initial carriage movement both away from the film frame and in a direction opposite to the normal travel of the film and then both toward the film frame and in the same direction as the film frame.

ROBERT H. LARSON.
MICHAEL C. SUPITILOV.

REFERENCES CITED

The following references are of record in the file of this patent:

UNITED STATES PATENTS

| Number | Name | Date |
|---|---|---|
| 1,142,852 | Simon | June 15, 1915 |
| 1,539,036 | Arnett | May 26, 1925 |
| 1,624,669 | Lehwess | Apr. 12, 1927 |
| 1,939,561 | Martin | Dec. 12, 1933 |
| 2,299,973 | Getten | Oct. 27, 1942 |
| 2,430,940 | Leland | Nov. 18, 1947 |